United States Patent

[11] 3,568,013

[72] Inventor Robert F. Blaha
Dedham, Mass.

[21] Appl. No. 787,717
[22] Filed Dec. 30, 1968
[45] Patented Mar. 2, 1971
[73] Assignee Texas Instruments Incorporated
Dallas, Tex.

[54] SOLID-STATE SWITCH
7 Claims, 5 Drawing Figs.

[52] U.S. Cl. 317/234, 317/235, 29/589
[51] Int. Cl. H01l 5/00
[50] Field of Search 317/234.4, 234.4.1, 234.6

[56] References Cited

UNITED STATES PATENTS

| | | | |
|---|---|---|---|
| 3,310,717 | 3/1967 | Hargasser et al. | 317/235 |
| 3,353,073 | 11/1967 | Majima et al. | 317/234 |
| 3,370,174 | 2/1968 | Toussaint | 250/211 |
| 3,381,081 | 4/1968 | Schalliol | 174/68.5 |
| 3,414,775 | 12/1968 | Melan et al. | 317/100 |
| 3,404,243 | 10/1968 | Krieger et al. | 179/110 |
| 2,882,462 | 4/1959 | Zierdt, Jr. | 317/235 |
| 3,390,226 | 6/1968 | Beyertein | 174/52 |
| 3,027,502 | 3/1962 | Moriguchi | 317/235 |
| 2,981,875 | 4/1961 | Kelley et al. | 317/235 |
| 3,476,987 | 11/1969 | Zido et al. | 317/234 |

FOREIGN PATENTS

| | | | |
|---|---|---|---|
| 1,029,096 | 4/1958 | Germany | 317/234X |

*Primary Examiner*—John W. Huckert
*Assistant Examiner*—B. Estrin
*Attorneys*—Harold Levine, Edward J. Connors, Jr., John A. Haug and James P. McAndrews

ABSTRACT: A low-cost degaussing switch having no moving parts comprising an open-ended, molded cup-shaped housing, an enclosing cover member, a pill of semiconductor material received in a seat formed in the housing, two combination spring contact-terminal members which are inserted through apertures in the housing and are biased against opposite faces of the pill. The contact-terminal members are shaped to enhance their electrical connection with the pill. An exemplary use of the switch in the degaussing circuit of a color television receiver is shown and described.

Inventor,
Robert F. Blaha,
by John C. Haug Att'y.

Inventor,
Robert F. Blaha,
by John C. Haug Att'y.

SOLID-STATE SWITCH

An object of this invention is to provide an electrical switch which is simple, reliable, yet inexpensive, and which can be mass-produced. Another object is the provision of a solid-state switch having no moving parts. Yet another object is the provision of a solid-state switch with improved electrical contact structure.

Other objects and features will be in part apparent and in part pointed out hereinafter.

Similar reference characters indicate corresponding parts throughout the several views of the drawings.

Dimensions of certain of the parts as shown in the drawings may have been modified and/or exaggerated for the purposes of clarity of illustration.

In the accompanying drawings, in which several of the various possible embodiments of the invention are illustrated:

In conventional color television receivers, chassis members, picture tube shadow masks and the like are usually formed of magnetically permeable materials. As a result, the receivers are susceptive to effects of the earth's magnetic field or other stray magnetic fields so that when the receivers are initially installed or are moved from one location to another, residual magnetic effects must be removed from the permeable receiver materials to assure proper formation of the electron images provided by the receivers. This process is known in the art as degaussing. The need for degaussing television receivers is well known in the art and various degaussing circuits have been employed usually in conjunction with conventional relays for shunting the degaussing coils after demagnetization of the receiver has been completed. In a copending and a coassigned application, Ser. No. 689,023, filed Dec. 8, 1967, use of a resistor having a positive temperature coefficient of resistance in series with the degaussing coil is set forth. Reference may be had to that application for complete details. As mentioned in the above-referenced application, a resistor of positive temperature coefficient of resistance in series with the degaussing coil can provide decaying current in the degaussing coil for accomplishing degaussing of the receiver and also provide a sharp increase in resistance after completion of such degaussing for effectively terminating current flow to the degaussing coil. The structure of the instant invention is particularly useful in this environment since it provides a simple, rugged design capable of being mass-produced at minimal expense. When so used, the switch will provide automatic degaussing of the color television receiver each time that the receiver is activated from a cold start.

Figure 5:
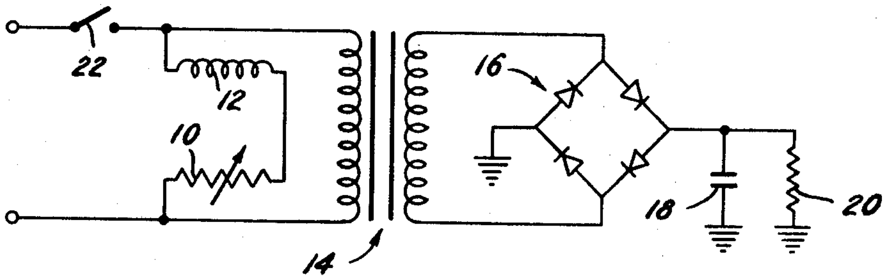
FIG. 5 is an exemplary circuit which illustrates one way in which a switch made in accordance with the invention can be used.

One circuit useful for effecting degaussing and which embodies apparatus of this invention is shown in FIG. 5 in which the switch 10 is serially connected to degaussing coil 12 in a television receiver circuit which is otherwise conventional. Switch 10 incorporates a resistor of positive temperature coefficient of resistivity which provides a decaying current in the degaussing coil 12 for accomplishing degaussing of the receiver and also being adapted to display a sharp increase in resistance after completion of such degaussing for effectively terminating current flow in the degaussing coil. The circuit shown also includes transformer 14, rectifier bridge 16 and a filter network comprising capacitor 18 and resistor 20, none of which are essential to the operation of the switch 10. While switch 10 is described herein as used in the FIG. 5 circuit, it will be understood that it is also useful in various other degaussing circuits. When switch 22 is initially closed, substantial current flows through the degaussing coil 12 and resistor 10 which is constructed of material having as a characteristic a large positive temperature coefficient of resistance (PTC) over a certain temperature range. This resistor has a relatively low resistance in the cold state (e.g., ambient room temperature) and when a voltage is applied across the material, a relatively large current is drawn with concomitant high heat generation. The temperature of the resistor therefore increases, causing an abrupt increase in resistance when an anomaly region is reached. This occurs near the Curie or transition point of perovskite-type materials and can be referred to as the PTC anomaly. The resulting increase in resistance reduces current flow through the degaussing coil after the degaussing is accomplished by the high inrush current. The degaussing (high inrush) current lasts about 100 milliseconds after which there is a symmetrical decay of current to the steady state value.

Figures 1, 2:
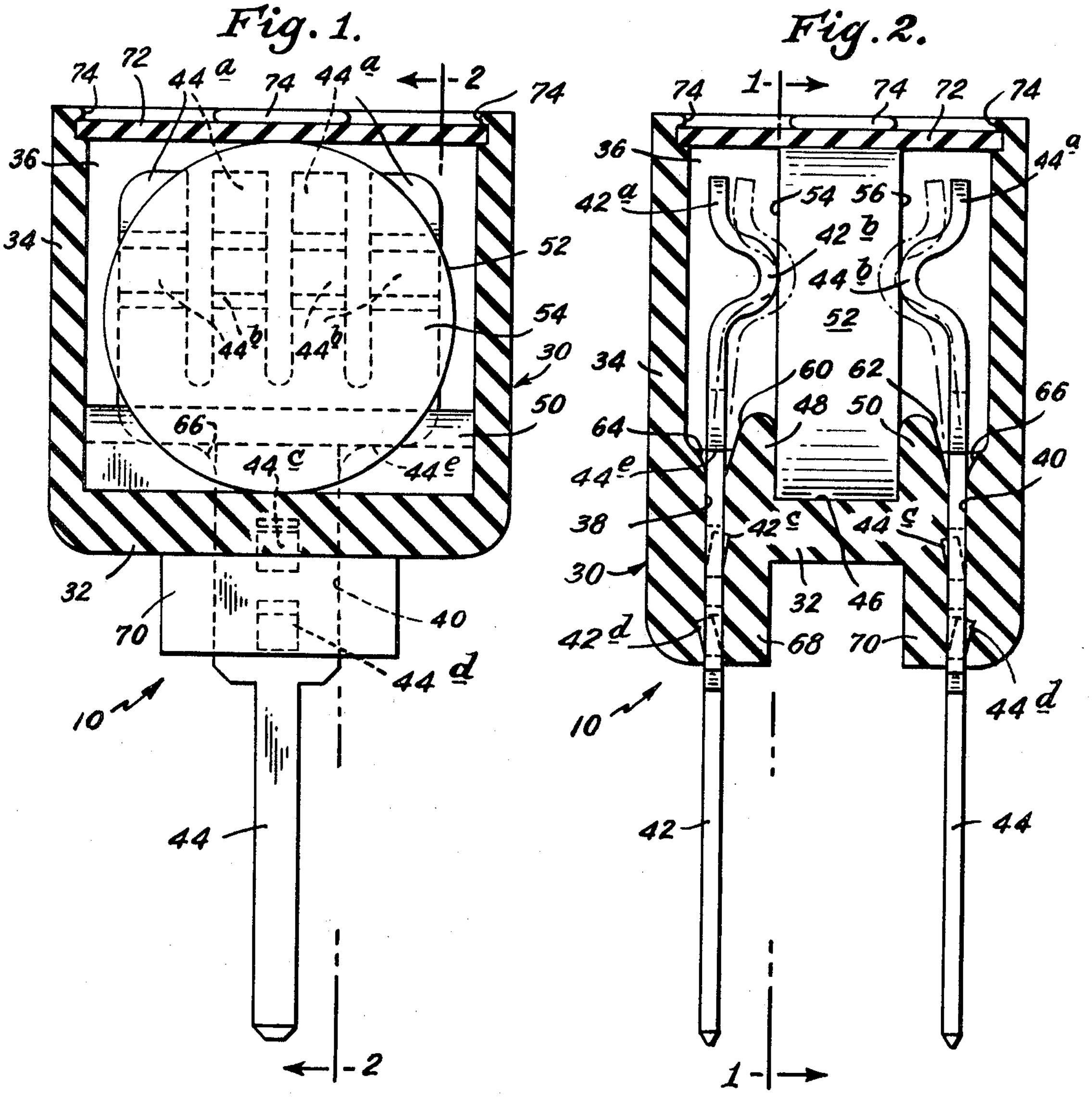
FIG. 1 is a cross-sectional view of a first embodiment of the invention taken on line 1–1 of FIG. 2.
FIG. 2 is a cross-sectional view taken on line 2–2 of FIG. 1.

Referring to FIGS. 1 and 2, a preferred embodiment of the switch 10 includes a molded housing 30 formed of rigid electrically insulating material such as a conventional glass-filled polysulfone. Housing 30 is generally cup-shaped having bottom wall 32 and upstanding wall 34 defining a cavity 36. Bottom wall 32 is formed with apertures 38, 40 in which are received combination contact-terminal members 42, 44 respectively. Also provided in bottom wall 32 is a seating portion 46, best seen in FIG. 2 formed by two generally parallel rib members 48, 50 which extend along the length of housing 30. It has been found helpful in some instances to extend the rib members along the two opposite portions of upstanding wall 34 to further avoid the possible dislodgement of pill 52 from its seat. Received in seating portion 46 is resistance element or pill 52, formed of a semiconductive material having a positive temperature coefficient of resistance. Such material can be a ceramic titanate such as lanthanum-doped barium titanate which is self-heating in response to the flow of current therethrough, assuming sufficient voltage levels and normal dissipation. The resistance of this material gradually increases until a temperature is reached, analogous to the Curie temperature at which the resistance sharply increases with only a slight increase in temperature. This is referred to as the anomaly temperature of the material. One example of this would be $Ba_{.997}La_{.003}TiO_3$ with an anomaly temperature of 120° C. The resistance of the material increases at the anomaly temperature as much as 150 percent per degree centigrade with the base resistivity (below the anomaly temperature) in the order of $10^2$ ohm cm. Pill 52 is cylindrical in shape and is metallized on opposite faces with layers 54, 56 respectively by conventional means such as plating, firing or ultrasonic soldering to optimize electrical contact between the contact-terminals 42, 44 and the pill 52. A layer which has been used is electroless nickel applied to the opposite faces of pill 52 on which a thin copper layer in the order of 0.75 mils and a thin silver layer in the order of 0.05 mils are electrolytically coated, one on top of the other.

The contact-terminal members 42, 44 are constructed out of material having good electrical conduction and spring characteristics, such as phosphor bronze or beryllium copper. The members are formed with a plurality of fingers 42, **44*a*, which serve as contacts to insure good electrical contact even if the planes forming the faces of the pill 52 are not perfectly parallel or if they are not perfectly flat or if the contact members are slightly askew. The members 42, 44 are prebent into the dotted line position. Pill 52, once located in seat 46, forces the contacts into the full line position. Fingers 42*a*, 44*a* are formed with a curved surface 42*b*, 44*b* which is the portion of the members which actually engage layers 54, 56 of pill 52. Again, this insures that the best possible electrical connection is made with pill 52** in spite of irregularities in the surfaces of the pill and the contact members.

In order to provide a firm, solid mount of the contact-terminal members, apertures 38 and 40 are dimensioned to closely fit members 42, 44. The bottom wall 32 of the housing is provided with inclined surfaces 60, 62 on the side of rib members 48, 50 and 64, 66 on the inner surface of wall 34 of housing 30 to facilitate insertion of the contact-terminal member 42, 44 into apertures 38, 40 respectively during assembly of the device. Contact-terminal member 42 is firmly locked in place with tabs 42*c* and 42*d* biased against the surface-defining aperture 38 (shown somewhat exaggerated in FIG. 2). In like manner, contact-terminal member 44 is securely locked in place by reason of tabs 44*c*, 44*d*. The tabs formed in members 42, 44 prevent further movement of the members in cavity 36. Movement in the opposite direction is prevented by contact of shoulder 44*e* with bottom wall 32 of the housing. Apertures 38, 40 are lengthened by providing bosses 68, 70 in bottom housing wall 32 to provide even more rigidity and obviate any tendency for members 42, 44 to rock in the apertures.

A dead air space is provided between the pill 52 and the housing sidewall 34 to thermally isolate the pill from ambient conditions.

An electrically insulating board 72 of arc and flame-resistant material, e.g., a mica and resinous mixture, encloses cavity 36 and is held in place by a plurality of lips 74 formed in the distal end portion of sidewall 34 as by deforming by heat.

Figure 3:
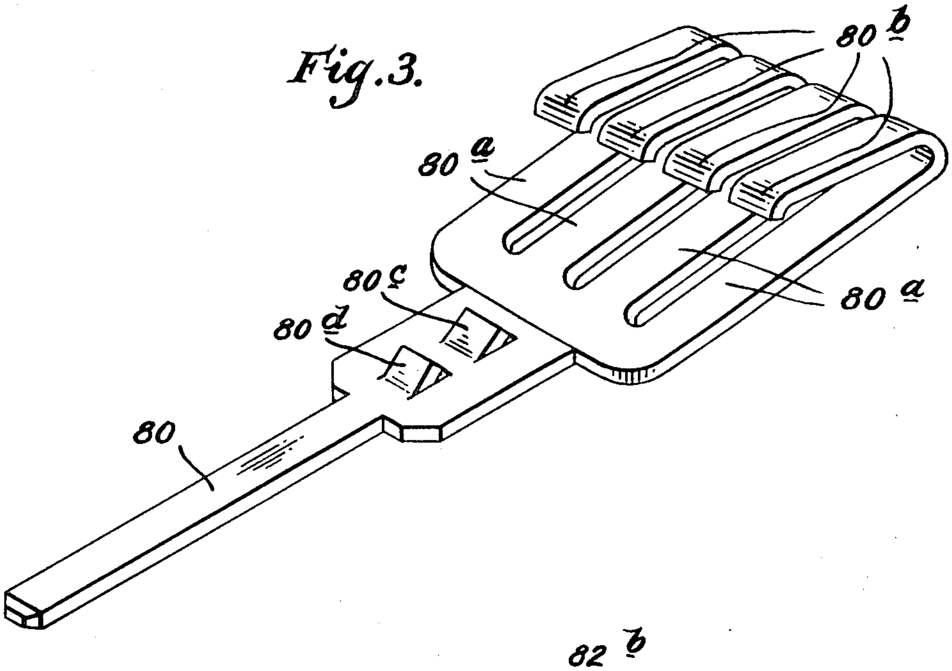
FIG. 3 is a perspective of a second type of contact-terminal member which can be employed in place of the type shown in FIGS. 1 and 2.
Figure 4:
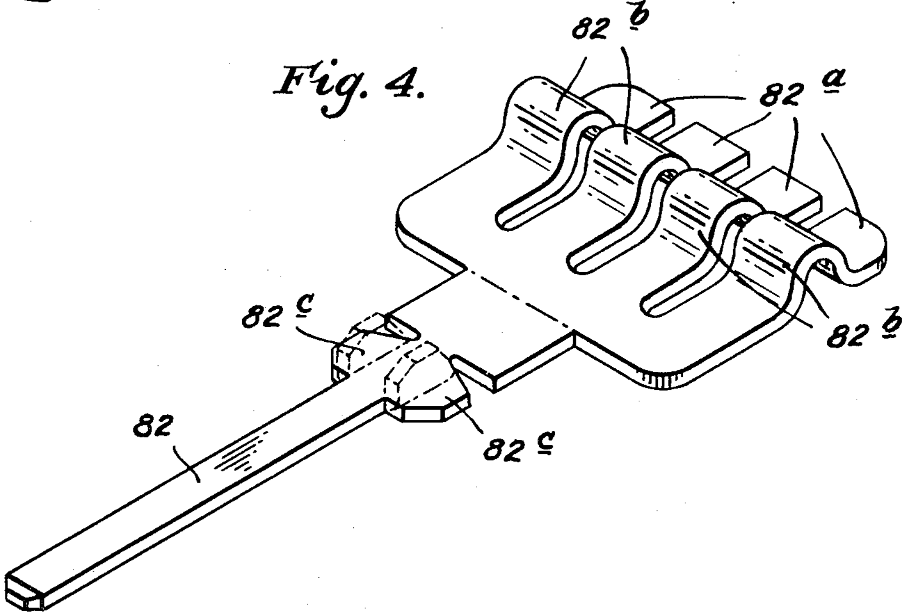
FIG. 4 is a perspective of a third type of contact-terminal member which also can be employed in place of the type shown in FIGS. 1 and 2.

In FIGS. 3 and 4, several other contact-terminal members are shown which can be employed in the structure of FIGS. 1 and 2 in place of members 42, 44. Since both contact-terminal members of a pair are the same, only one of each pair will be described. In FIG. 3 is shown contact-terminal member 80 provided with fingers 80*a*, each of which is generally J-shaped and formed with curved portion 80*b* near the free end. Tabs 80*c* and 80*d* are located on the same side of the elongated body portion of member 80 and are biased back toward the plane of the elongated body portion during insertion into the case 30 to firmly lock member 80 in place.

Another variation is shown in FIG. 4 wherein contact-terminal member 82 is provided with fingers 82*a*. Each finger 82*a* is formed with curved surface 82*b* and the elongated body portion has tabs 82*c* are bent as indicated in dotted lines after insertion in apertures 38, 40 of housing 30 to lock member 82 in place.

In view of the above, it will be seen that the structure of the switch is simple, rugged, has no moving parts and is conducive to employment of mass production techniques; that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A solid-state switch comprising:
   a housing having a bottom wall and upstanding sidewalls forming an opening, two apertures and a recessed seating portion provided in the bottom wall, and a ledge provided in the free end of the upstanding sidewalls;
   a pill of semiconductor material having two spaced electrically conductive portions received in the seating portion;
   an elongated contact-terminal member inserted through each aperture, one end of the member serving as a contact portion, the other end as a terminal portion;
   the contact portion formed of a plurality of fingers, each having a curved surface and biased into good electrical connection with a respective conductive portion of the pill; and
   a cover member received on the ledge of the sidewall and enclosing the opening in the housing.

2. A switch according to claim 1 in which the pill is in spaced relation to the sidewalls so that the pill is thermally isolated from the ambient.

3. A switch according to claim 1 in which a boss is provided for each bottom wall aperture to permit a more rigid mounting of the contact-terminal member in the housing.

4. A switch according to claim 1 in which tabs are provided in the contact-terminal member and are bent out of the plane of the member to preclude movement of the member into the housing.

5. A switch according to claim 4 in which at least one tab in each contact-terminal member is located within the apertures.

6. A switch according to claim 1 in which the contact portion of each contact-terminal member is generally J-shaped in cross section having a long and a short leg, the distal free end of the short leg being curved and in engagement with a conductive layer of the pill, and the long leg being connected to the terminal portion.

7. An electric switch comprising a housing, a piece of semiconductor material mounted in the housing, at least two contact-terminal members mounted in the housing extending from without to within the housing, the contact portion of the contact-terminal member formed with a plurality of fingers, each finger being curved and having a free end, and biased into engagement with the piece of semiconductor material, and the contact-terminal members securely locked in the biased position in engagement with the piece of semiconductor material by tabs located without the housing and bent out of the plane of the member.